INVENTORS
NORMAN R. GAROFANO
ALAN G. FOLLOWS
BY
Gerard P. Rooney
ATTORNEY

INVENTORS
NORMAN R. GAROFANO
ALAN G. FOLLOWS
BY
ATTORNEY

United States Patent Office 3,705,790
Patented Dec. 12, 1972

3,705,790
PROCESS FOR INCREASING BULK DENSITY OF SODIUM CARBONATE BY THE ADDITION OF CALCIUM ION
Norman R. Garofano, Syracuse, and Alan G. Follows, Camillus, N.Y., assignors to Allied Chemical Corporation, New York, N.Y.
Filed Dec. 1, 1970, Ser. No. 94,141
Int. Cl. C01d 7/00
U.S. Cl. 23—302    15 Claims

ABSTRACT OF THE DISCLOSURE

Invention relates to an improved process for the preparation of sodium carbonate precursor crystals by a crystallization process which involves forming a first crop of said carbonate precursor crystals from a substantially saturated carbonate process solution and providing in the mother liquor separated from said first crop of crystals a sufficient amount of calcium ions such that when the mother liquor is subjected to crystallization at a temperature higher than that employed to obtain the first crop of said precursor crystals, a second crop of sodium carbonate precursor crystals of improved quality is obtained.

---

Trona, as found in the Green River area of Wyoming consists mainly of sodium sesquicarbonate $$(Na_2CO_3 \cdot NaHCO_3 \cdot 2H_2O)$$

A typical analysis of trona contains:

| Constituent: | Percent |
|---|---|
| $Na_2CO_3$ | 45 |
| $NaHCO_3$ | 36 |
| $H_2O$ | 15.30 |
| NaCl | 0.04 |
| $Na_2SO_4$ | 0.01 |
| $Fe_2O_3$ | 0.14 |
| Organic matter | 0.30 |
| Insolubles | 3.20 |

In addition to a water-insoluble fraction resulting from the association of the trona with shale stringers or beds in the trona deposits, organic matter in the order of about 0.3% is present which would contaminate the desired product, e.g. sodium carbonate precursor crystals, unless it is removed. It is believed that the organic matter in the trona consists of kerogenaceous material containing monocarboxylic acids, dicarboxylic acids, certain unsaturated acids, steroids and certain rosin acids. Furthermore, in order to improve the desired physical properties of the sodium carbonate precursor crystals, it is customary to add to the solution to be crystallized organic surface active agents, such as alkylated benzene sulfonate, as crystallization modifiers to improve crystallization. Likewise, organic defoaming agents and other organic impurities picked up in the circulating liquors in the plant are present in the solution prior to and during crystallization. The presence of these organics to any appreciable extent is not desired because they adversely affect crystal quality, e.g., discoloration of the crystals and reduction in bulk density, which may limit the extent of use of the precursor crystals, particularly if they are to be converted to dense soda ash for use in the glass industry.

In co-pending U.S. application Ser. No. 757,511 (which disclosure is specifically incorporated herein by reference) filed Sept. 4, 1968, now U.S. Pat. No. 3,653,848, there is disclosed an improved crystallization process wherein a first crop of sodium carbonate precursor crystals, e.g., sodium carbonate monohydrate, sodium sesquicarbonate, anhydrous sodium carbonate, and sodium bicarbonate, are formed from a substantially saturated carbonate process solution and subjecting the mother liquor separated from the first crop of crystals to further crystallization, including a crystallization temperature higher than that employed to obtain the first crop of crystals, to effect the formation of a second crop of precursor crystals. Among the significant advantages of that improved crystallization process is the fact that the soluble organics derived from calcined trona which are concentrated in the mother liquor feed to the high temperature crystallization do not adversely affect the crystal quality of the second crop of sodium carbonate precursor crystals. The chemical and physical quality of the crystals formed at the high temperature crystallization are improved over those obtained at lower temperatures. The organic impurities are lower and the crystal shape and bulk density are improved. The improved shape of the precursor crystals rather than the density of the crystals is the major factor in determining the improved bulk density of the final soda ash product since the density of the precursor crystals is nearly uniform while the crystal shape could vary widely. The physical quality of the crystals separated as the second crop of crystals from the improved crystallization process can, however, sometimes be poor with respect to the desired crystal shape. For instance, instead of the desired "blocky' or brick-like shaped monohydrate crystals of high bulk density, undesirable long, wide, flat precursor crystals of sodium carbonate monohydrate are oftentimes obtained. These flat precursor crystals have an undesirable low bulk density and are easily broken in the subsequent handling and drying stages of the process for the commercial production of soda ash from the precursor monohydrate crystals.

It has now been found that the problem concerning the poor physical quality of precursor crystals obtained as the second and subsequent crop of crystals has been substantially obviated by the discovery that the mother liquor subjected to crystallization which results in the second crop of precursor crystals is oftentimes deficient in calcium ion content and that the addition of calcium ion to the evaporator feed liquor results in a second crop of precursor crystals of improved physical quality regarding crystal shape, bulk density and granulation. While the exact mechanism is not known with certainty regarding how the addition of calcium ion causes the improvement in the physical quality of the precursor crystals, it is certain that calcium ion addition alone causes a significant improvement in the physical properties of the resultant precursor crystals obtained as the second crop of crystals from the aforementioned improved crystallization process.

While a number of prior art patents disclose that calcium ions may be present in a system for the production of sodium carbonate crystals, these references either teach that the presence of the calcium ion in the crystallizer feed adversely affects the crystals produced and therefore should be reduced to a very low level by various techniques or the presence of the calcium ion alone does not consistently produce a carbonate crystal product of acceptable quality. For instance, U.S. Pat. No. 3,131,-996 teaches that the calcium content of crystallizer feed liquor should be maintained in a fixed range of total hardness, as calcium carbonate, to prevent excessive calcium contamination of the soda ash product. The principle of this patent is the control of total hardness, as calcium carbonate, through the adjustment of the hardness of the natural waters of the Green River area. The total hardness of the dissolver discharge is maintained within a preferred range to prevent the deposition of pirssonite scale on subsequent plant lines and operating equipment as well as prevent the introduction of excessive calcium in the crystallizer feed. There is nothing in this patent teaching that crystal quality is improved by maintaining a certain level of calcium ion in the crystallizer feed, much less the crystallizer feed liquor to the high temperature evaporator used in the present invention.

U.S. Pat. No. 3,459,497 teaches the use of both calcium and magnesium ion as a method of producing soda ash of increased bulk density. Calcium and magnesium are added as their chlorides to a typical evaporator feed liquor in an amount such that the resultant dried soda ash product contains preferred calcium and magnesium contents. The necessity for both ions in the product and the requirement of the minimum magnesium ion content of 24 p.p.m. are drastically different than the conditions necessary for the practice of the method of the present invention.

U.S. Pat. No. 3,233,983 teaches the effect of calcium ion control in a process for the production of soda ash through the crystallization of sodium sesquicarbonate precursor crystals. The process involves both calcium ion control through water softening and the use of an anionic-active surfactant for crystal quality control. The calcium ion control through water softening is such that the evaporator feed liquor is maintained below a stated range of calcium ion concentration. The calcium ion concentration of the crystallizer feed liquor is maintained such that the calcium concentration is less than 40 p.p.m. calcium as calcium ion and preferably less than 30 p.p.m. The calcium ion control must be utilized along with the anionic-active surface active agent which is employed as a crystal growth promoting additive for the sodium sesquicarbonate crystallization. The prescribed low calcium ion level in evaporator feed liquor and the necessity of a surface active agent differ significantly from the process of the present invention.

In the practice of the present invention the mother liquor separated from the first crop of sodium carbonate precursor crystals and which has been substantially reduced in its calcium ion content is adjusted prior to crystallizing a second crop of crystals to provide in the mother liquor feed to the high temperature evaporator a minimum of about 40 parts per million (p.p.m.), preferably at least about 50 p.p.m., calcium ion. The amount of calcium ion provided in the mother liquor is dictated by the quality of the soda ash product desired, i.e. bulk-density, crystal shape and calcium content in the final product. In general, the low level of calcium, as calcium carbonate, in the finished soda ash product, is of little significance to the glass-making industry which utilizes the major portion of the soda ash product today. In the present invention it has been found that an upper practical limit on the concentration of calcium ion in the mother liquor to the high temperature evaporator is about 200 p.p.m., preferably about 150 p.p.m. calcium ion. The calcium ion preferably is added as a calcium salt which will provide in the mother liquor solution, which is an essentially saturated carbonate process solution, the desired calcium content. Typical of such salts include both soluble and slightly soluble organic and inorganic salts, such as calcium acetate, calcium chloride, calcium carbonate, calcium nitrate, calcium phosphate, calcium sulfate, calcium hydroxide and the hydrated double salt of calcium and sodium sodium carbonate, pirssonite. Preferably, the water soluble salts are employed, with calcium chloride especially preferred. In the practice of the present invention it has been found that the mother liquor after the first crop of precursor crystals has been separated contains less than about 25 p.p.m. calcium ion. Therefore, the amount of calcium salt added to mother liquor to provide at least the minimum amount of about 40 p.p.m. calcium ion will be adjusted according to the analysis of the calcium ion in the mother liquor which is to be sent to the high temperature evaporator of the present invention. The calcium salt is normally added in the form of an aqueous solution or suspension.

In the practice of the present invention a first crop of sodium carbonate precursor crystals is formed from a carbonate process solution, these crystals are separated from mother liquor and the mother liquor is subjected to crystallization conditions including temperatures higher than those employed to obtain the first crop of precursor crystals to effect crystallization of a second crop of precursor crystals. However, prior to the formation of the second crop of crystals, sufficient calcium ion is provided in the mother liquor. It has been found that the calcium ion content in the feed stream to the lower temperature effects oftentimes is carried out with the crystals formed in these effects and the resulting deficiency in calcium ion content in the mother liquor has been found to adversely affect the quality of the precursor crystals generated in the higher temperature crystallizer. It is to this type of operation that the present invention is directed. Soda ash obtained from the precursor crystals produced by the process of the present invention is characterized by a bulk density in excess of about 1000 grams per liter (about 62.5 pounds per cubic foot).

By the phrase "carbonate process solution" is meant a substantially saturated aqueous solution from which the sodium carbonate precursor crystals, i.e. sodium bicarbonate, sodium sesquicarbonate, anhydrous sodium carbonate and sodium carbonate monohydrate, may be crystallized as the stable crystal phase and recovered from mother liquor. The crystallization procedure of the present invention is also applicable to sodium carbonate-sodium bicarbonate process solutions derived from other natural minerals such as nahcolite ($NaHCO_3$), thermonatrite ($Na_2CO_3 \cdot H_2O$), natron ($Na_2CO_3 \cdot 10H_2O$), and dawsonite ($NaAlCO_3(OH)_2$), particularly when these minerals are associated with or near kerogen type deposits. The carbonate process solutions derived from these minerals, including trona, contain varying proportions of sodium carbonate and sodium bicarbonate together with soluble organic impurities. The "carbonate process solution" may be prepared, as described hereinbelow, by various procedures and contains about 10 to 1000, preferably about 10 to 500 p.p.m. organic carbon, basis sodium carbonate.

Figure 1:
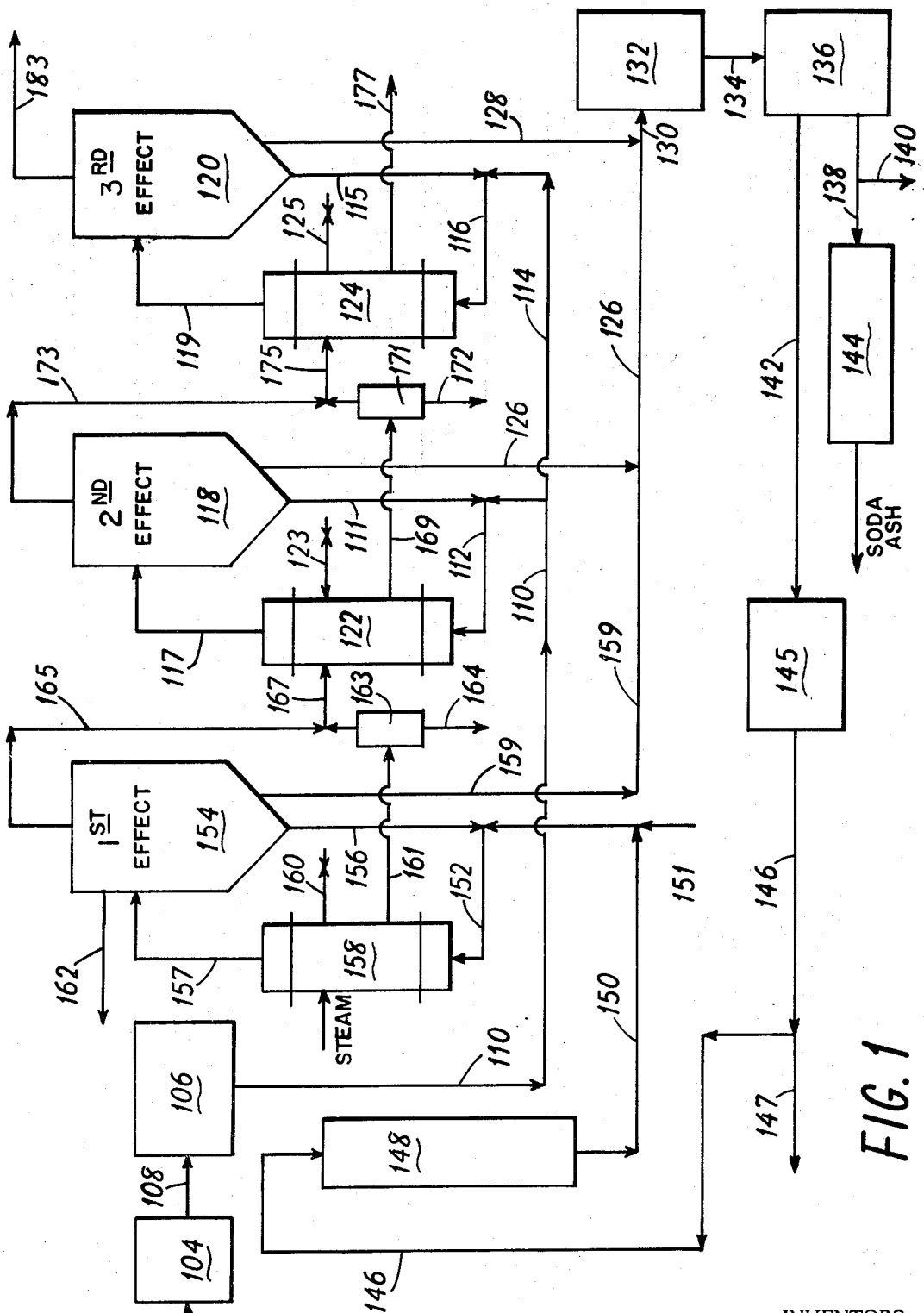
FIG. 1 is a schematic of the crystallization technique of the present invention.

In a typical torona processing operation a carbonate process solution which has been clarified and filtered is passed in series through crystallization units, typically "multiple effect" evaporator crystallizers. In general three crystallizers, evaporators or effects of known design are fed the carbonate process solution and the feed passes through the crystallizers in a chosen direction, generally first to the crystallizer operated at the highest temperature (first effect) then to the next crystallizer operated at a temperature lower than that in the first effect crystallizer. The "effects" are numbered in the direction of steam flow. As the carbonate process solution passes through the crystallizers a slurry of sodium carbonate precursor crystals is formed and passed to each succeeding crystallizer. The slurry is passed from one effect to the other in the chosen direction by a series of pumps. From the last effect the slurry, containing about 15 to 60%, preferably about 30 to 50%, solids, is allowed to settle. The sodium carbonate precursor crystals are separated and the mother liquor separated from the sodium carbonate precursor crystals is combined with the freshly filtered carbonate process solution which is to be fed to the crystallizers to effect crystallization of a second crop of precursor crystals.

In each one of these prior art processes, the carbonate process solution generally first enters the crystallizer operated at highest temperature (first effect) and passes in series in the form of a slurry through the crystallizers, each succeeding one being operated at a lower temperature than the previous one. In the event the solids content of the slurry which is being pumped through the crystallization unit becomes too thick or viscous a portion of the slurry may be withdrawn and passed to a crystal separator. The slurry, after removal from the last of the multiple effect crystallizers, is separated into the sodium carbonate precursor crystals and the mother liquor, for instance by a centrifuge. The crystals are either dried and stored or passed to a dryer or calciner and converted to soda ash. The mother liquor is then recycled to the system passing through the first effect evaporator crystallizer together with clarified and filtered trona process solution not previously treated in the crystallizer. In each of the above crystallizations the calcium ion which may have been present in the feed liquor fed to the crystallizers is present in the various crystallizers during the formation of the precursor crystals.

However, in the practice of the present invention the carbonate process solution which has been clarified and filtered, and is first fed for crystallization to the crystallizer(s) operated at the lower temperatures, e.g. the second and third effects of a multiple effect evaporator system, produces a mother liquor separated from the sodium carbonate precursor crystals which is usually deficient in the required minimum amount of calcium ion, i.e. at least about 40 p.p.m., to produce precursor crystals characterized by improved physical shape and high bulk density.

The carbonate process solution may be subjected to crystallization in any of the well known types of evaporative crystallizers commonly employed. Preferably, however, for purposes of economy, it is preferred in the operation of the present invention to employ as the crystallization system three evaporative crystallizers. However, it is possible to practice the present invention employing a greater or lesser number of crystallizers, the choice being one of economy.

Reference is now made to FIG. 1, which represents a flow diagram of one form of a crystallization system of the present invention for crystallizing sodium carbonate precursor crystals from carbonate process solution. Initially it is observed from FIG. 1 that the carbonate process solution is first fed in parallel to the second and third effect crystallizers.

A substantially saturated carbonate process solution which will crystallize the desired precursor crystals as the stable crystal phase under the crystallization conditions chosen passes via line 102 through a crystallizer feed preheater 104 to crystallizer feed storage or surge tank 106 by line 108. From the crystallizer feed storage tank 106 the trona process solution is pumped to the second and third effect crystallizers 118 and 120, respectively, in parallel feed. Preferably, each of these effects 118 and 120 provides for a separate recirculation of carbonate process solution through the effects by withdrawing a slurry of the sodium carbonate precursor crystals via lines 111 and 115, respectively, from the bottom of each effect and pumping it back into the main bodies of these effects after combining it with the trona process solution from the feed tank 106 by lines 110 and 112 and by lines 110, 114 and 116, respectively. The combined streams to each of the effects passes through heat exchangers 122 and 124, respectively, wherein each feed is heated indirectly with the condensing vapors from the preceding higher temperature crystallizer to bring the carbonate process solution to the desired crystallization temperature range.

The amount of recirculation in each effect may be controlled within limits, which in turn controls the so-called "flash range" of the crystallizers. The flash range is the difference in temperature between that prevailing in the crystallizer and that of the recirculating feed to the crystallizer. For instance, if the desired sodium carbonate precursor crystal is sodium carbonate monohydrate, the carbonate process solution entering the first effect is heated by saturated steam having a temperature of about 116° C. so that the recycled mother liquor separated from the precursor crystals is heated by the steam having a temperature of about 116° C. when it enters the first effect crystallizer 154. The temperature of the crystal slurry removed from this effect via line 159 is from about 105° to 109° C. This latter temperature is therefore that prevailing in the first effect. The condensate exiting via line 161 from the heat exchanger 158 is passed to flash tank 163. The steam from this flash tank is combined with the vapor from the first effect evaporator via line 165, and this combined vapor stream, at a temperature of about 99° C., enters heat exchanger 122 via line 167. The crystal slurry which leaves the second effect is at a temperature of about 88° C. to 96° C. Likewise, the condensate leaving heat exchanger 122 via line 169 is passed to second effect flash tank 171, and the steam from this flash tank, combined with the vapor leaving the second effect via line 173 enter heat exchanger 124 via line 175. This combined vapor stream is used to heat the carbonate process solution fed to the third effect crystallizer 120. The feed to this effect is heated to about 82° C. and the crystal slurry leaving this effect preferably is at a temperature of about 71° to 79° C. Thus, the preferred flash range in each of these effects is about 3° to 11° C.

The carbonate process solution, after being heated in the heat exchangers 122 and 124, is passed to the crystallizers 118 and 120, via lines 117 and 119, respectively. Crystallization is effected under conditions to form the desired sodium carbonate precursor crystal in the form of a slurry. The crystal slurry from the second and third effects 118 and 120 is drawn off via lines 126 and 128 and passed to an agitated slurry holding tank 132 by line 130. Desirably, the slurry contains approximately 40% solids in a crystal slurry draw. The slurry is passed from the holding tank 132 via line 134 to separator 136, wherein the sodium carbonate precursor crystals are separated from the mother liquor. The precursor crystals are removed fom separator 136 via line 138 and may be either removed via line 140 and dried and stored for future use or converted to soda ash in calciner 144.

The mother liquor solution removed from separator 136, substantially saturated with the desired sodium carbonate precursor crystal and having a higher concentration of impurities than the carbonate process solution fed to the second and third effect crystallizers, is passed via line 142 to mother liquor storage tank 145. An assay of the calcium ion content of the mother liquor is made. The mother liquor is pumped from the storage tank 145 and passed to mother liquor deaerator 148 via line 146. A portion of the mother liquor may be recycled to the dissolving unit via line 147, as will be discussed below concerning the use of the present crystallization system in combination with the various trona processes described in the prior art. The mother liquor from the mother liquor deaerator 148 is pumped via lines 150 and 152 through heat exchanger 158 to first effect crystallizer 154 via line 157. The amount of calcium ion required to produce precursor crystals of the desired quality in the first effect crystalizer is added to the system via line 151.

Recirculating is carried out in the first effect crystallizer by recirculating a portion of the slurry from crystallizer 154 via lines 156 and 152 through heat exchanger 158. The slurry of sodium carbonate precursor crystals is removed from crystallizer 154 by line 159 and combined with the slurry streams removed from the second and third effect crystallizers 118 and 120. The combined streams of sodium carbonate precursor crystal slurry containing about 25% to about 45% solids is passed via line 130 to slurry tank 132 and treated as above to separate the crystals from the mother liquor. The first effect crystallizer 154 is provided with means for purging a portion of the recycled mother liquor from the system and passing this to waste via line 162. This may be accomplished by monitoring the impurities level in the recycled mother liquor so that it does not exceed an organic carbon level of about 300 to 5,000 parts per mililon, preferably about 300 to 3,000 parts per million, basis sodium carbonate. When it is necessary due to an unsatisfactory concentration of impurities in the recycled mother liquor to the first effect, purge of mother liquor from the first effect evaporator in an amount equivalent to about 1 to about 10 percent, preferably 3 to about 5 percent of the total sodium carbonate introduced to the process is preferred to reduce the impurities level to a concentration which does not seriously affect crystal quality. Desirably, the sodium carbonate precursor crystals contain 1 to 100, preferably 5 to 60 parts per million organic carbon impurity.

The condensate removed from the flash tanks 163 and 171 via lines 164 and 172, respectively, and from heat interchanger 124, via line 177 depending on its purity and demand, is either returned to the boiler house or sent to a condensate storage for use as make-up water in the process. Vacuum is applied to the system via line 183 and can be provided, for example, by a conventional water cooled condenser and steam ejector combination. The non-condensibles, during start-up and operation, are removed by conventional manipulation of the valves on the noncondensed gas vent lines 160, 123 and 125 from the steam space of the heat exchangers 158, 122 and 124. These lines may be connected to the vapor spaces of the corresponding effects or to the main vacuum line 183.

Instead of the carbonate process solution being fed in parallel to the second and third effects 118 and 120, the carbonate process solution may be fed in series to the system, first to the second effect 118, and the slurry removed therefrom may be fed to the third effect 120. The mother liquor separated from the sodium carbonate precursor crystals formed in the second and third effects is then sent to the first effect 154. Alternatively, the carbonate process solution may be first fed to the third effect 120, the mother liquor separated from the sodium carbonate precursor crystals sent to the second effect 118 to form a second crop of crystals and the mother liquor separated from these crystals sent to the first effect 154 to form a third crop of precursor crystals. In such operations the mother liquid in each instance should be monitored for calcium ion content and the required amount of calcium ion added to provide for improved crystal quality.

As mentioned above, the crystallization procedure of the present invention is applicable to the preparation of precursor crystals of sodium carbonate, i.e. sodium sesquicarbonate, anhydrous sodium carbonate, sodium carbonate monohydrate and sodium bicarbonate, from Wyoming trona in a variety of ways previously proposed. For instance, if the desired precursor crystal is sodium sesquicarbonate, the crude trona is dissolved in an aqueous solution, preferably containing a recycled mother liquor, which solution contains an excess amount of carbonate over bicarbonate. The substantially saturated carbonate process solution containing sodium sesquicarbonate is then clarified and filtered and the filtrate is then passed to a crystallization system, described above, operated under conditions such that sodium sesquicarbonate crystallizes as the stable phase. The sodium sesquicarbonate crystals are separated from the mother liquor and a portion of the mother liquor is recycled to the dissolver to dissolve more crude trona and the other portion of mother liquor having the desired minimum calcium ion content is passed to the high temperature crystallizer to form a second crop of sodium sesquicarbonate crystals. The sesquicarbonate crystals may be dried and stored or they may be converted to soda ash, such as by calcination. Typical of the processes describing the preparation of sodium sesquicarbonate from trona which may employ the crystallization technique of the present invention are described in U.S. Pats. Nos. 2,346,140, 2,639,217, 2,798,790 and 3,028,215.

Another known method for the processing of trona in which a carbonate process solution may be subjected to the crystallization procedure of the present invention is the preparation of anhydrous sodium carbonate by maintaining the crystallization temperature in the crystallization units above about 109° C., the transition temperature at which anhydrous sodium carbonate is formed as the stable crystal phase. Typical of this process is the one described in U.S. Pat. No. 2,770,524.

Still another method in which the crystallization procedure of the present invention for the processing of trona process solution may be employed is in the preparation of sodium bicarbonate from crude trona which comprises dissolving the crude trona in an aqueous solution, preferably heated, containing sodium carbonate and sodium bicarbonate values, preferably a hot recycle mother liquor stream containing sodium bicarbonate and sodium carbonate values in which the bicarbonate content of the solution is greater than the amount originally found in crude trona. This may be accomplished by treating the recycled mother liquor either before or after said dissolution has taken place with carbon dioxide. The solution is clarified and filtered and then subjected to crystallization procedure of the present invention under crystallization conditions such that the sodium bicarbonate in the carbonate process solution crystallizes out as the stable crystal phase. The sodium bicarbonate crystals are separated from the mother liquor and they are either recovered and dried or converted to sodium carbonate, such as by calcination. A portion of the mother liquor, preferably after treatment with carbon dioxide, is recycled to dissolve more additional crude trona. The other portion of mother liquor having the desired minimum calcium ion content is sent to a higher temperature crystallizer. Typical of this process which may be adapted incorporating the crystallization technique of the present invention is that disclosed in U.S. Pat. No. 2,704,239.

Figure 2:
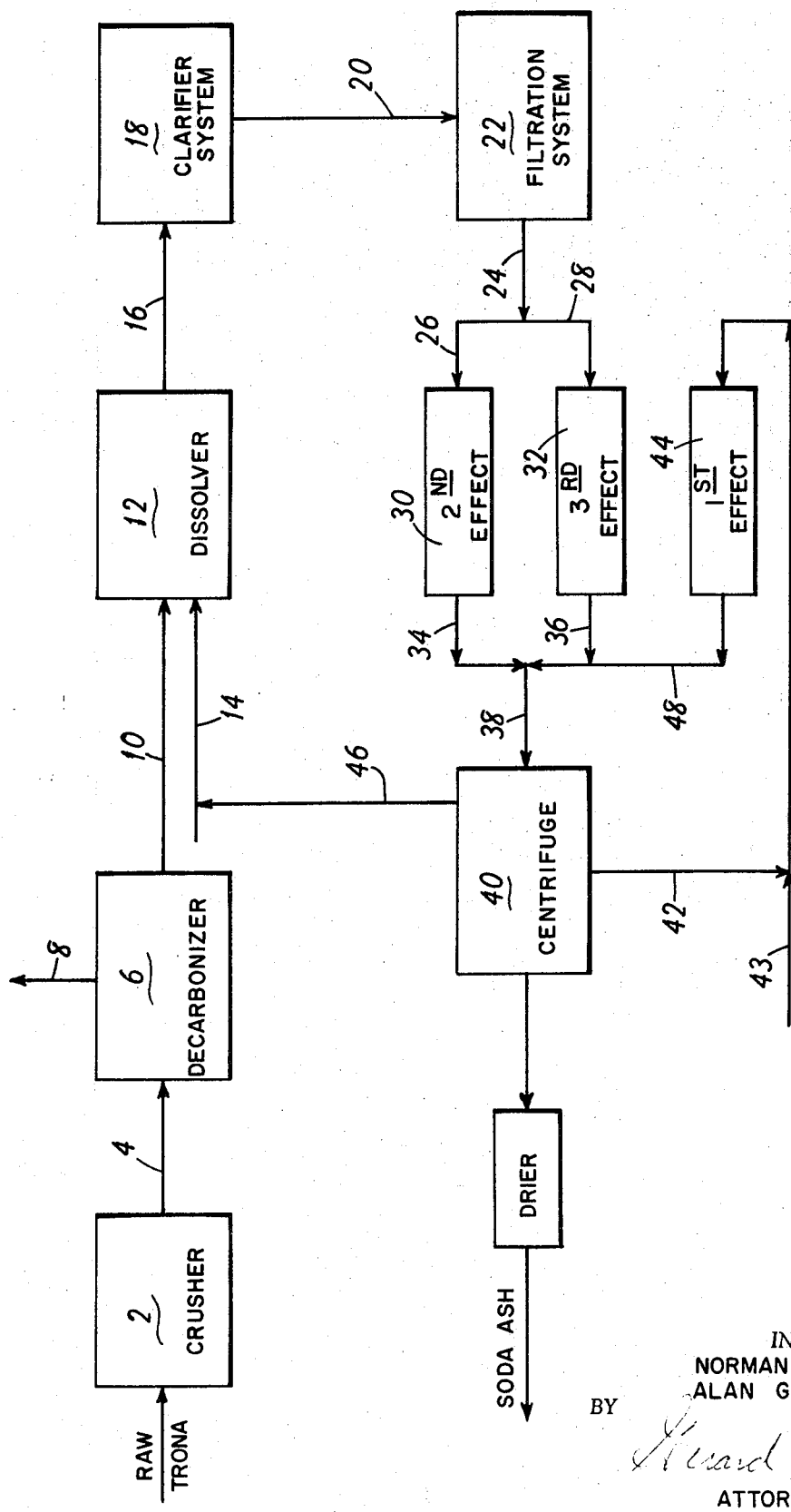
FIG. 2 is a schematic of a typical trona process for preparing sodium carbonate monohydrate crystals by the crystallization technique of the present invention.

A further method in which the crystallization procedure of the present invention may be employed for producing sodium carbonate precursor crystals is the so-called "sodium carbonate monohydrate" method. Reference is made to FIG. 2, which represents a schematic of one form of a monohydrate trona processing operation using the present crystallization technique. Raw trona which has been mined is first crushed in crusher 2. The crude trona is passed via line 4 to decarbonizer 6 wherein the crude trona is heated to convert the trona to crude sodium carbonate by driving off water and carbon dioxide via line 8. This crude product is then passed via line 10 to dissolver 12 wherein the crude sodium carbonate is dissolved in an aqueous solution to prepare a substantially saturated carbonate process solution containing sodium carbonate. Make-up solution which may comprise process water, recycled mother liquor separated from the monohydrate crystals, plant condensate, river or spring water and the like, enters dissolver 12 via line 14. The carbonate process solution is then passed via line 16 to clarifier system 18, and filtration system 22 via line 20. This solution is then passed via lines 24, 26, and 28 to crystallizers comprising second effect evaporator crystallizer 30 and third effect evaporator crystallizer 32 operated in parallel wherein sodium carbonate monohydrate crystals are formed in each of these crystallizers as the stable crystal phase. The sodium carbonate monohydrate slurry from each of these crystallizers is passed via lines 34, 36 and 38 to monohydrate centrifuge 40. The sodium carbonate monohydrate crystals are separated from the mother liquor and passed to the dryer. The mother liquor from centrifuge 40 is monitored for its calcium ion content and the necessary amount of calcium ion is added to the mother liquor via line 43 to provide in it at least about 40 p.p.m. of calcium ion prior to passing it to the high temperature crystallizer 44, via line 42. A portion of the mother liquor prior to calcium ion addition may be recycled via lines 46 and 14 to the dissolving unit 12.

The slurry from first effect 44 is combined via line 48 with the slurries from the second effect 30 and third effect 32 and sent to the monohydrate centrifuge 40. The sodium carbonate monohydrate crystals may be dried to remove excess moisture and stored or they may be converted to soda ash by drying to remove the water of hydration. Alternatively, the clarified and filtered carbonate process solution, substantially saturated with sodium carbonate, instead of being passed in parallel to the second and third effect evaporator crystallizers 30 and 32, as shown, may be passed in series first to the second effect evaporator crystallizer 30, and the monohydrate slurry formed therein passed to the third effect crystallizer 32. The combined slurry from these effects is then passed to the monohydrate centrifuge 40, as described above.

Crystallization of sodium carbonate monohydrate can be effected at temperatures ranging from about 36° C. to 109° C. For best results it has been found in the monohydrate process employing multiple effect evaporators that the first effect evaporator crystallizer 44 be maintained at a temperature between approximately 70° to 109° C., preferably at a temperature of about 85° to 109° C., the second effect evaporator crystallizer maintained at a temperature of approximately 53° to 99° C., preferably at a temperature of 68° C. to 96° C. and the third effect evaporator crystallizer maintained at a temperature of 36° to 85° C., preferably at a temperature of 50° to 79° C. Exemplary disclosures of the monohydrate process in which the crystallization procedure of the present invention may be applicable may be found in U.S. Pats. Nos. 2,343,080, 2,343,081, 2,962,348, 3,131,996 and 3,260,567.

EXAMPLE I

Trona ore which had been dry mined and crushed to approximately a minus ¼ inch size, containing approximately 85–90% sodium sesquicarbonate, is heated at elevated temperatures ranging from about 150° C. to about 500° C., to effect decarbonization, i.e. drive off carbon dioxide and water, of the crude trona whereby the sesquicarbonate is converted to crude sodium carbonate. The crude sodium carbonate is then dissolved in an aqueous solution forming a carbonate process solution containing approximately 28% to 30% sodium carbonate. The carbonate process solution containing undissolved grit and mud is passed through a clarification system to remove insoluble solids, such as shale and dirt, and is drawn off as thickened mud from the system. Flocculents may be added to the carbonate process solution to assist in coagulation and settling of such solids. The clarified liquor is then filtered through activated carbon in order to reduce those impurities, such as organics, which interfere with the quality of crystals formed during crystallization. The treated sodium carbonate solution is collected after filtration in storage tanks and passed through a polishing filter to remove any entrained carbon in the solution. The carbonate process solution containing 30 to 40 p.p.m. calcium ion is fed in parallel to the second and third effects, with respect to steam, operated under conditions, including temperatures of 70°–90° C., to form a slurry of sodium carbonate monohydrate. The sodium carbonate monohydrate slurry containing approximately 40% solids is removed and the crystals of sodium carbonate monohydrate are separated from the mother liquor. The mother liquor analyzes 30% by weight $Na_2CO_3$, 1500–2000 p.p.m. soluble carbon (basis soda), 10–20 p.p.m. calcium ion content (basis soda) and 1–5 p.p.m. magnesium ion content (basis soda).

To a number of samples of the mother liquor are added various chemical additives either as an aqueous solution or suspension. The mother liquor is subjected to crystallization conditions for the production of a second crop of sodium carbonate precursor crystals. These conditions include a temperature of about 95° C. and approximately 9 inches of mercury vacuum. Condensate from the evaporation during crystallization is withdrawn continuously in proportion to the mother liquor feed rate. The mother liquor feed rate to the crystallizer is approximately 1 kilogram of solution per hour and slurry samples of the monohydrate crystals are withdrawn periodically at a rate sufficient to maintain the slurry density of the crystallizer system at a nearly constant value of approximately 45% weight monohydrate crystals. After 11 to 12 hours of continuous operation the crystallizataion is stopped and the final crystallizer bed crystals are separated from the supernatant liquor by vacuum filtration. The monohydrate bed crystals are washed with alcohol and air dried and the chemical and physical properties are measured along with the chemical properties of the separated liquor.

The results of the individual effect of the chemical additives on the monohydrate crystals obtained during crystallization may be seen from the data in Table I.

TABLE I.—EFFECT OF INORGANIC ADDITIVES ON LABORATORY CRYSTALLIZATION

[Mother liquor: Soda content—approx. 30% $Na_2CO_3$; Soluble organics—1,500–2,000 p.p.m. carbon basis soda; Calcium content—10–20 p.p.m. basis soda; Magnesium content—1–5 p.p.m. basis soda]

| Run No. | Salt added to mother liquor | Calculated additive to mother liquor [1] (A) | Monohydrate bed crystals Found [2] (p.p.m./soda) | Estimated crystal axes ratio (L:W:T)[3] | Bulk density (g.p.l.)[4] |
|---|---|---|---|---|---|
| 1 | None | None | 25 p.p.m. $Ca^{++}$ | 7:3:1 | 1,010 |
| 2 | $Ca^{++}$ (as $CaCl_2$) | 40 p.p.m. $Ca^{++}$ | 80 p.p.m. $Ca^{++}$ 80 | 4.6:2.2:1 | 1,195 |
| 3 | $Ca^{++}$ (as Pirssonite-$CaCO_3 \cdot Na_2CO_3 \cdot 2H_2O$) | 110 p.p.m. $Ca^{++}$ | | 4.3:2.0:1 | 1,120 |
| 4 | $Ca^{++}$ (as $CaCl_2$); $Mg^{++}$ (as $MgSO_4$) | 100 p.p.m. $Ca^{++}$; 150 p.p.m. $Mg^{++}$ | 110 p.p.m. $Ca^{++}$; 180 p.p.m. $Mg^{++}$ | 2.9:1.5:1 | 1,220 |
| 5 | $Mg^{++}$ (as $MgSO_4$) | 0 p.p.m. $Ca^{++}$; 150 p.p.m. $Mg^{++}$ | 20 p.p.m. $Ca^{++}$; 110 p.p.m $Mg^{++}$ | 5.6:2.6:1 | 1,090 |
| 6 | $Ca^{++}$ (as $CaCl_2$) | 100 p.p.m. $Ca^{++}$; 0 p.p.m. $Mg^{++}$ | 80 p.p.m. $Ca^{++}$; 2 p.p.m. $Mg^{++}$ | 2.7:1.5:1 | 1,220 |
| 7 | $Cl^-$ (as NaCl) | 180 p.p.m. $Cl^-$ | 10 p.p.m. $Ca^{++}$; 2 p.p.m. $Mg^{++}$; 100 p.p.m. Cl | 5.9:2.9:1 | 1,050 |

[1] In addition to the calcium and magnesium originally present in the mother liquor.
[2] Additive content basis anhydrous sodium carbonate.
[3] Length: Width: Thickness.
[4] Grams per liter
$\frac{}{16.019}$ = Pounds per cubic foot.

From the data of Table I it may be seen that the benefits obtained in crystal geometry and bulk density by the sole use of calcium ion are as good as or better than the benefits obtained from the use of magnesium ion alone or the combined use of calcium and magnesium ions (Runs Nos. 2, 3 and 6 versus 4 and 5). This singular effect of calcium ion which causes an improvement in the bulk density of the sodium carbonate precursor crystals is an unexpected result in view of the prior art teachings that both calcium and magnesium are necessary to improve the bulk density. Furthermore, the effect of the singular use of calcium ion for the improvement in crystal quality of crystals derived from mother liquor containing significant quantities of soluble organic species derived from calcined trona ore is also unexpected in view of the nearly similar prior art teaching that both calcium ion and an anionic-active surfactant crystal modifier are necessary for the production of improved sodium sesquicarbonate crystals which are precursor crystals to sodium carbonate.

The concentrations of calcium ion found of benefit as shown in Runs Nos. 2, 3 and 6 of Table I demonstrate that concentrations of at least 40 p.p.m. calcium ion basis contained soda ash significantly improve the physical quality of sodium carbonate precursor crystals. This concentration level of calcium ion surprisingly has been found to be of benefit since it is greater than the normal solubility limit for calcium ion in saturated soda ash solution at 95° C. as reported in U.S. Pat. 3,131,996 (column 5, lines 3 to 9).

EXAMPLE II

Mother liquor prepared in a manner similar to the mother liquor of Example I is continuously fed to a high temperature crystallizer operated at about 104° C. To the mother liquor a calcium solution containing 32% by weight calcium chloride is continuously added over a period of 72 hours.

The rate of calcium ion addition is equivalent to approximately 75 to 100 p.p.m. calcium ion basis the contained sodium carbonate of the mother liquor. The mother liquor fed to the crystallizer results in a second crop of sodium carbonate precursor crystals formed at a temperature and pressure higher than the crystallizers which formed the first crop of precursor crystals. Representative samples of the crystals formed in the higher temperature crystallizer are obtained, filtered, alcohol washed, air dried and examined for their chemical and physical quality. The results are reported in Table II, below.

to a second crystallization effected at a temperature higher than the temperature maintained during said first crystallization sufficient to effect formation of a stable crystal phase of said precursor crystals and separating said precursor crystals from a second mother liquor, the improvement which consists in adding to the said first mother liquor, having a calcium ion concentration, basis sodium carbonate, of less than about 25 parts per million, after said first crystallization, and prior to said second crystallization calcium ion in an amount sufficient to provide in said first mother liquor a calcium ion concentration of between 40 and 200 p.p.m., basis sodium carbonate, and converting said precursor crystals to sodium carbonate characterized by a bulk density in excess of about 1000 grams per liter.

2. The process of claim 1 wherein the calcium ion concentration in the mother liquor is between 50 and 150 p.p.m., basis sodium carbonate.

3. The process of claim 1 wherein the mother liquor prior to calcium ion addition has less than 40 p.p.m. calcium ion, basis sodium carbonate.

4. The process of claim 1 wherein the calcium ion is added as an inorganic calcium-containing salt.

5. The process of claim 1 wherein the calcium ion is added as an organic calcium-containing salt.

6. The process of claim 4 wherein the salt is calcium chloride.

7. The process of claim 1, wherein the precursor crystals are sodium sesquicarbonate.

8. The process of claim 1 wherein the precursor crystals are sodium bicarbonate.

9. The process of claim 1 wherein the precursor crystals are sodium carbonate monohydrate.

TABLE II.—PHYSICAL AND CHEMICAL PROPERTIES OF MONOHYDRATE CRYSTALS

| | Number of hours crystallizer in operation before the start of calcium addition | | Number of hours of operation after start of continuous calcium addition (75-100 p.p.m. Ca++/soda) | | | 24 hours of operation after end of calcium addition |
|---|---|---|---|---|---|---|
| | 120 | 72 | 24 | 48 | 72 | |
| Bulk density (g.p.l.) | 980 | 927 | 1,167 | 1,231 | 1,141 | 890 |
| Estimated crystal axes ratio (Length:Width:Thickness) | 7:3:1 | 9:3:1 | 3:1.6:1 | 3.5:2:1 | 3:1.6:1 | 10:4:1 |
| Screen analysis (percent): | | | | | | |
| +20 mesh U.S. | 0.1 | 0.5 | 0.0 | 0.0 | 0.0 | 0.0 |
| +30 mesh | 4.8 | 8.8 | 1.1 | 0.8 | 3.9 | 4.6 |
| +60 mesh | 75.8 | 71.3 | 72.7 | 75.3 | 88.6 | 79.3 |
| +100 mesh | 16.2 | 16.6 | 19.4 | 20.3 | 6.4 | 14.0 |
| +200 mesh | 2.8 | 2.5 | 6.1 | 3.3 | 0.8 | 1.9 |
| Pan | 0.3 | 0.3 | 0.7 | 0.3 | 0.3 | 0.2 |
| Chemical analysis, p.p.m. Ca++/soda | ca. 24 | 22 | 95 | 98 | 78 | 22 |
| Spectro. analysis, p.p.m. Mg++/soda | ca. 4 | 3 | 3 | 5 | 2 | 2 |

These data demonstrate the striking improvement in the physical and chemical properties of the monohydrate precursor crystals, i.e. crystal shape, bulk density and granulation (a significant decrease in the +30 mesh screen fraction as a result of the calcium ion addition).

We claim:

1. In a process for the formation of at least sodium carbonate precursor crystal selected from the group consisting of sodium bicarbonate, sodium sesquicarbonate, anhydrous sodium carbonate and sodium carbonate monohydrate from a carbonate process solution which consists essentially in subjecting said carbonate process solution containing about 10 to 1000 parts per million of soluble organic impurities, basis sodium carbonate, to a first crystallization, effecting said first crystallization at a temperature and under crystallization conditions sufficient to effect formation of a stable crystalline phase of said precursor crystals in a first mother liquor, separating said precursor crystals from said mother liquor containing an organic impurity level of 300 to 5000 parts per million, basis sodium carbonate, and substantially free of said stable crystalline phase of said precursor crystals produced in said first crystallization, subjecting said mother liquor 10. The process of claim 1 wherein the precursor crystals are anhydrous sodium carbonate.

11. The process of claim 1 wherein crystallization is effected in a multiple effect crystallization system containing three crystallizers, said first crystallization being effected in the second and third effects of said system and said second crystallization being effected in the first effect of said system.

12. The process of claim 11 wherein said first crystallization is effected at a temperature ranging from about 36° C. to about 99° C. and said second crystallization being effected at a temperature ranging from about 70° C. to 109° C.

13. The process of claim 11 wherein said first crystallization in the second effect crystallizer is conducted at a temperature ranging from about 53° C. to 99° C.

14. The process of claim 11 wherein said first crystallization in the third effect crystallizer is conducted at a temperature ranging from about 36° C. to 85° C.

15. The process of claim 11 wherein the carbonate process solution is fed in parallel to the second and third effect crystallizers.

References Cited

UNITED STATES PATENTS

| | | | |
|---|---|---|---|
| 2,770,524 | 11/1969 | Seaton et al. | 23—63 |
| 3,131,996 | 5/1964 | Seglin et al. | 23—63 |
| 3,189,408 | 6/1965 | Miller | 23—63 |
| 3,233,983 | 2/1966 | Bauer | 23—300 |
| 3,264,057 | 8/1966 | Miller | 23—300 |
| 3,459,497 | 8/1969 | Coglaiti | 23—300 |

NORMAN YUDKOFF, Primary Examiner

S. SILVERBERG, Assistant Examiner

U.S. Cl. X.R.

23—63, 300